(12) United States Patent
Shin et al.

(10) Patent No.: US 9,983,690 B2
(45) Date of Patent: May 29, 2018

(54) FOUR ROW OVERLOADED QWERTY-LIKE KEYPAD LAYOUT

(71) Applicants: Joon Shin, Lynchburg, VA (US); Hyun Woo Shin, Falls Church, VA (US)

(72) Inventors: Joon Shin, Lynchburg, VA (US); Hyun Woo Shin, Falls Church, VA (US)

( * ) Notice: Subject to any disclaimer, the term of this patent is extended or adjusted under 35 U.S.C. 154(b) by 0 days. days.

(21) Appl. No.: 15/151,485

(22) Filed: May 10, 2016

(65) Prior Publication Data
US 2017/0010682 A1 Jan. 12, 2017

Related U.S. Application Data

(63) Continuation-in-part of application No. PCT/US2014/072616, filed on Dec. 29, 2014.

(60) Provisional application No. 61/921,074, filed on Dec. 26, 2013, provisional application No. 62/159,349, filed on May 10, 2015.

(51) Int. Cl.
*G06F 3/02* (2006.01)
*G06F 3/023* (2006.01)
*G06F 3/0488* (2013.01)

(52) U.S. Cl.
CPC .......... *G06F 3/0219* (2013.01); *G06F 3/0233* (2013.01); *G06F 3/04886* (2013.01)

(58) Field of Classification Search
CPC ........................ G06F 3/04886; G06F 3/0489
See application file for complete search history.

(56) References Cited

U.S. PATENT DOCUMENTS

| | | |
|---|---|---|
| 5,487,616 A | 1/1996 | Ichbiah |
| 5,818,437 A | 10/1998 | Grover et al. |
| 6,731,227 B2 | 5/2004 | Horie |
| 7,339,498 B2 | 3/2008 | Ahn |
| 7,475,004 B2 | 1/2009 | Fux et al. |
| 7,620,540 B2 | 11/2009 | Fux et al. |
| 7,658,562 B2 | 2/2010 | Suess |
| 7,843,364 B2 | 11/2010 | Elizarov et al. |
| 7,864,076 B2 | 1/2011 | Ahn |
| 8,593,404 B2 | 11/2013 | Vuong et al. |
| 8,791,905 B2 | 7/2014 | Elizarov et al. |
| 8,890,719 B2 | 11/2014 | Salman et al. |

(Continued)

FOREIGN PATENT DOCUMENTS

| | | |
|---|---|---|
| KR | 20-0379362 Y1 | 3/2005 |
| KR | 10-0765032 B1 | 10/2007 |

OTHER PUBLICATIONS

M. Silfverberg et al, "Predicting Text Entry Speed on Mobile Phones," CHI Letters (The Future is Here) vol. 2, Issue 1, pp. 9-16. Apr. 2000.

(Continued)

*Primary Examiner* — Kevin M Nguyen
(74) *Attorney, Agent, or Firm* — Hyun Woo Shin; Novick, Kim & Lee, PLLC

(57) ABSTRACT

Provided is an overloaded keypad layout which is efficient, ergonomic, unambiguous, intuitive to operate, and also familiar to the average user in its letter arrangement. More particularly, the overloaded keypad layout comprises four rows, and a space-key is positioned in the third row from bottom, and is QWERTY-like its letter arrangement. Further, the multitap input method or selector (select-the-next-letter key) input method may be employed to disambiguate the overloaded keypad layout.

14 Claims, 9 Drawing Sheets

(56) References Cited

U.S. PATENT DOCUMENTS

| | | | |
|---|---|---|---|
| 2006/0228149 A1* | 10/2006 | Harley | G06F 3/04886 400/486 |
| 2008/0316183 A1* | 12/2008 | Westerman | G06F 3/0416 345/173 |
| 2008/0318617 A1 | 12/2008 | Ladouceur et al. | |
| 2009/0073003 A1 | 3/2009 | Chang | |
| 2011/0007004 A1 | 1/2011 | Huang et al. | |
| 2011/0206437 A1 | 8/2011 | Baker | |
| 2012/0189368 A1 | 7/2012 | Jawerth et al. | |
| 2013/0298064 A1* | 11/2013 | Choi | G06F 3/04886 715/771 |

OTHER PUBLICATIONS

I. Scott Mackenzie et al, "LetterWise : Prefix-based Disambiguation for Mobile Text Input," Proc. UIST 2001.

I. S. Mackenzie et al, "Text entry using soft keyboards" Behaviour & Information Technology, vol. 18, No. 4, pp. 235-244, 1999.

S. Zhai, M. Hunter, and B.A. Smith, "Performance Optimization of Virtual Keyboards," Human-Computer Interaction, vol. 17, pp. 89-129, 2002.

I.S. Mackenzie and W. Buxton, "Extending Fitts' Law to Two-Dimensional Tasks," Proc. of CHI '92, pp. 219-226, May 1992.

I. S. Mackenzie, "Fitts' Law As a Research and Design Tool in Human-Computer Interaction," Human-Computer Interaction, vol. 7, pp. 91-139, 1992.

I. Scott MacKenzie, "KSPC (Keystrokes per Character) as a Characteristic of Text Entry Techniques," Proc. of 4th International Symp. Human Computer Interaction with Mobile Devices, pp. 195-210, 2002.

D. Wigdor and R. Balakrishnan, "TiltText: Using Tilt for Text Input to Mobile Phones" Department of Computer Science, University of Toronto, pp. 81-90, 2003.

H. Ryu and K. Cruz, "LetterEase: Improving text entry on a handheld device via letter reassignment" Proc. of OZCHI 2005 (Nov. 23, 2005).

Xiaojun Bi et al, "Quasi-QWERTY Soft Keyboard Optimization" CHI 2010: Interfaces and Visualization, pp. 283-286 (Apr. 10, 2010).

J. Cuaresma and I. S. MacKenzie, "A Study of Variations of QWERTY Soft Keyboards for Mobile Phones," Proceedings of the International Conference on Multimedia and Human Computer Interaction, Paper No. 126. Jul. 18, 2013.

E. Matias, "Half-QWERTY: Typing With One Hand Using Your Two-handed Skills" CHI '94, pp. 51-52. Apr. 24, 1994.

R. W. Soukoreff and I. S. MacKenzie, "Theoretical Upper and Lower Bounds on Typing Speed Using a Stylus and Soft Keyboard," Behaviour & Information Technology, 14, pp. 370-379, 1995. Retrieved Jan. 9, 2018, http://www.yorku.ca/mack/bit95.html.

Martin Hosken, "An introduction to keyboard layout design theory: What goes where?" Feb. 17, 2003, Retrieved Jan. 9, 2018, http://scripts.sil.org/KeybrdDesign.

A. Rehman. "Super Keyboard Automatically Turns What You Type Into 'Alien Text'". Oct. 28, 2011 (retrieved from internet, Jan. 9, 2018, at URL: http://www.addictivetips.com/mobile/super-keyboard-automatically-turns-what-you-type-into-alien-text-android/.

* cited by examiner

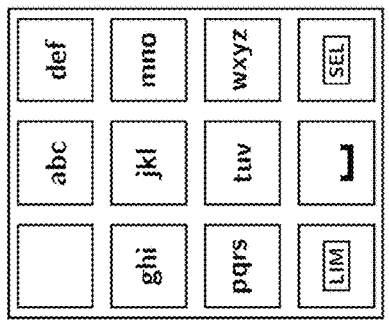
Fig. 1
(Prior Art)
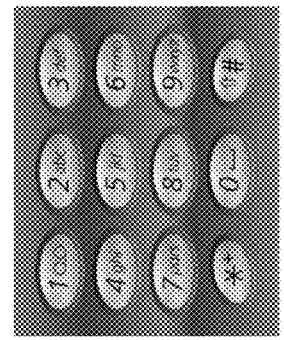
Fig. 2
(Prior Art)
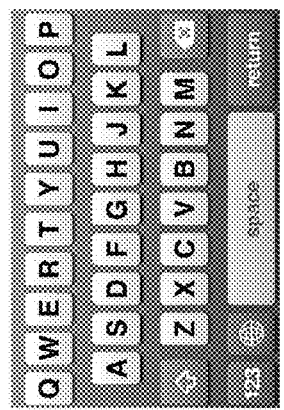
Fig. 3
(Prior Art)
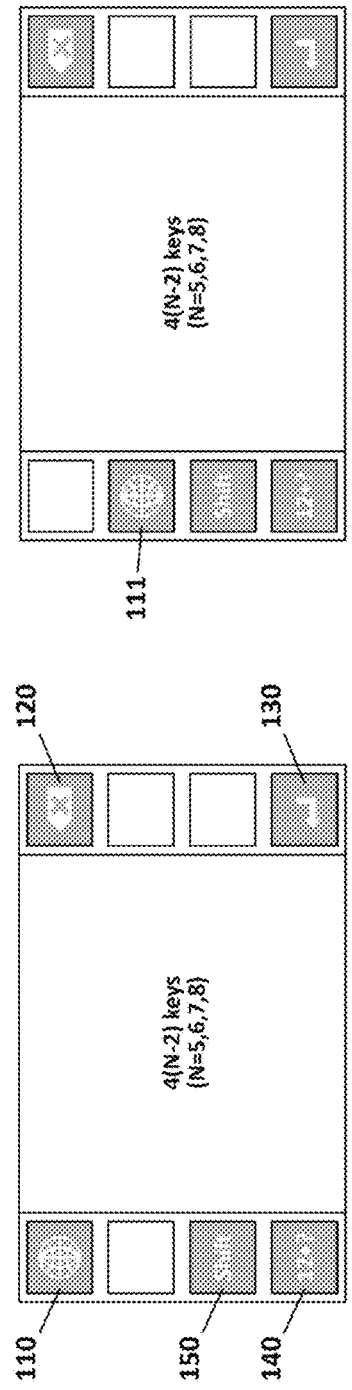
Fig. 4(a)
Fig. 4(b)

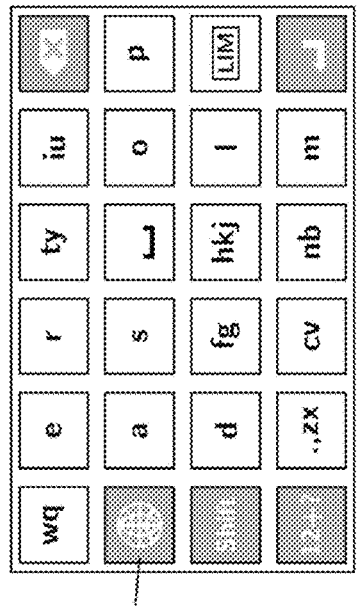
Fig. 6(a)
Fig. 6(b)
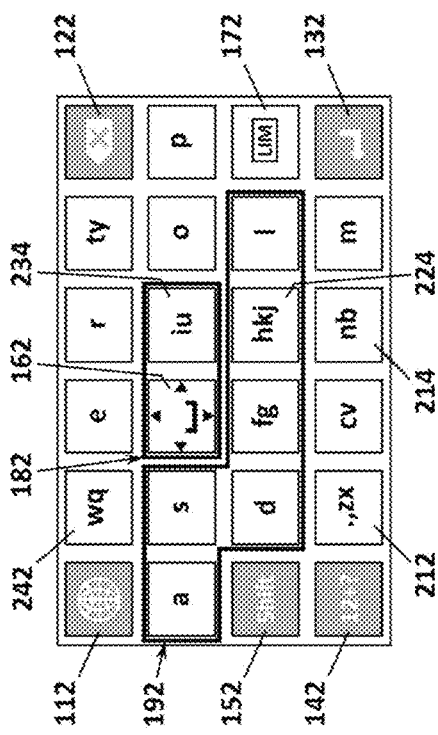
Fig. 5(a)
Fig. 5(b)

| ⊗ | | 1.67% | 3.93% | ↵ |
|---|---|---|---|---|
| 9.04% | 5.06% | 8.26% | 4.62% | 2.09% |
| 6.27% | 17.60% | 8.28% | 3.54% | 7.10% |
| 1.64% | 10.35% | 3.25% | 3.37% | 0.24% |
| | 6.64% | | | |

| ⊗ | | 9.62% | 3.40% | ↵ |
|---|---|---|---|---|
| 10.46% | 5.06% | 10.50% | 5.96% | 1.433% |
| 10.35% | 17.60% | 11.95% | 13.81% | |
| 6.64% | 5.32% | | | |
| 1.73% | 5.08% | | | |

Fig. 12(a)

| X |  | p |  | ik |  | Y |
|---|---|---|---|---|---|---|
| iu |  | o |  | hj |  | m |
| ty |  | l |  | SEL |  | nb |
| r |  | s |  | fg |  | cv |
| e |  | a |  | d |  | ,.zx |
| wq |  |  |  |  |  |  |

Fig. 12(b)

| X | 1.67% | 3.93% | P |
|---|---|---|---|
| 8.26% | 6.27% | 4.62% | 2.09% |
| 9.04% | 17.60% | 8.28% | 7.10% |
| 5.06% | 5.32% | 3.54% | 3.37% |
| 10.35% | 6.64% | 3.25% | 0.24% |
| 1.64% |  |  |  |

Fig. 11(a) — labels 436, 425

Fig. 11(b)

| X | 7.94% | 3.40% | P |
|---|---|---|---|
| 9.04% | 6.02% | 5.16% | 2.09% |
| 5.06% | 2.24% | 7.84% | 7.10% |
| 10.35% | 17.60% | 3.54% | 3.37% |
| 1.64% | 5.32% | 3.25% | 0.24% |
| 6.64% |  |  |  |

.# FOUR ROW OVERLOADED QWERTY-LIKE KEYPAD LAYOUT

CROSS-REFERENCE TO RELATED APPLICATIONS

This application is a continuation-in-part of International Application No. PCT/US2014/072616 filed on Dec. 29, 2014, and claims the benefit of priority from U.S. provisional applications 61/921,074 and 62/159,349 filed on Dec. 26, 2013, and May 10, 2015, respectively.

TECHNICAL FIELD

The invention relates to keypad layouts, and more particularly, to keypad layouts for text entry using multitap input method or similar variations thereof.

BACKGROUND ART

Keypads are used in electronic devices which require human input, particularly input of alphanumerical text. Examples of such electronics include, but not limited to, computers, laptops, portable handheld communication devices such as mobile phones and PDAs, facsimile, computer tablets, GPS navigation systems, electronic dictionaries, ATMs, and order and ticket kiosks. In most of these devices, input of alphanumerical text is performed by one or two fingers, or by an input vehicle such as a stylus, and ten-finger touch-typing option is not available.

While some keypads exist in conventional button-type keys, most keypads are implemented on touch screen displays for newer electronic devices. An advantage of touch screen keypad is that the input language, size and number of keys, and alphabet arrangement can be freely modified according to user preference. Further, touch screen keypads can employ various input mechanisms not available in keypads using button-type keys, such as drag and swipe mechanisms.

There are many types of keypad layouts depending on the input language and user preference. For English, two of the most widely known keypad layouts are the QWERTY keypad layout shown in FIG. 1, which is a miniature version of the alphabet arrangement of the computer QWERTY keyboard, and the 4 by 3 standard (ITU-T E.161) keypad layout (FIG. 2) employing either the conventional multitap input method (hereafter may be referred to as "the multitap method") or T9 predictive text input method. The ITU-T E.161 standard keypad layout may hereafter be referred to as "the 12-key keypad".

Vast majority of users are familiar with the QWERTY keypad alphabet arrangement and its method of operation. However, its large number of keys, which are often times displayed in a limited keypad area, results in small individual key sizes, which causes high error rate and discomfort to the user. Further, the QWERTY keypad layout is considered as an inappropriate choice for keypads operated by one or two fingers or by a stylus because of its poor aspect ratio (10:4) and ergonomically inefficient letter assignment. Ergonomic inefficiency of the QWERTY keypad layout has been well documented, although users familiar with the QWERTY keypad layout may not be consciously aware of it.

The 12-key keypad shown in FIG. 2 is an overloaded keypad layout. An overloaded keypad layout is hereby defined as a keypad layout having a number of keys available for letter input which is less than the total number of letters. Additionally, an overloaded key is a key to which multiple letters are assigned. In the 12-key keypad, only eight keys are available for actuation of twenty-six letters, and those keys are heavily overloaded with three or four letters. An overloaded key creates ambiguities as to which letter is intended for actuation by a single keystroke. The ambiguities are resolved, or disambiguated, by the multitap method. The user presses a key repeatedly to actuate the desired letter. While resolving the ambiguities, the multitap method also increases the number of keystrokes to enter a letter, which substantially increases the total number of keystrokes for a heavily overloaded keypad.

Another disadvantage of an overloaded keypad layout, such as the 12-key keypad of FIG. 2, is that entry of consecutive letters assigned to the same key cause further ambiguity. For example, when entering the word "cap" using the 12-key keypad of FIG. 2, the user must press the "abc" key four times, then the "pqrs" key once. However, this input sequence results in the following seven possible entries: "aaaap", "aabp", "acp", "abap", "baap", "bbp", and "cap". Thus, the user input is still ambiguous since there are more than one possible outputs.

To disambiguate entries for consecutive letters overloaded in the same key, a short pause can be used. The user would wait a short amount of time which would allow the processor to "timeout" the ambiguity. From the example above of entering the word "cap", the user would press "abc" key three successive times to actuate the letter "c", pause to disambiguate, press the same key once more to actuate the letter "a", then press the "pqrs" key once to actuate the letter "p". Using this timeout method of disambiguation causes discomfort to the user since whenever there is an ambiguity, the user has to pause between text input, momentarily stop the typing flow, and wait for a predetermined amount of time.

Discomfort due to timeouts can be partially solved in the multitap method by use of a delimiter key, also known as "timeout-kill key". The delimiter key is a function key which is entered in lieu of a timeout. By pressing the delimiter key, the user signals the completion of an entry and "kills the timeout" so that any subsequent entry (or entries) after the delimiter key is associated with entry of a new letter. By pressing the delimiter key, the user can continue the input sequence without interrupting the typing flow. Alternatively, delimiter function, or timeout-kill, may be achieved by other actions, including drag-assisted motions.

Applying a delimiter key or an equivalent timeout-kill action for disambiguation still causes some discomfort to the user since it demands the user's attention to apply the delimiter key in the appropriate situations. Users who are not familiar with the multitap method may have difficulty understanding and/or operating the "timeout" and delimiter disambiguation methods.

A viable alternative input method to the multitap method is the selector (select-next-character) key input method, which resolves the ambiguity issues inherent in an overloaded keypad. The selector key input method, also known as the "conversion key" input method and may hereafter be referred to as "the selector method", is a relatively new and not widely known input method. In the previously mentioned multitap method, the user presses the same key multiple times to actuate the desired character. However, in the selector method, the user presses the key associated with the desired character once, and presses a predefined selector key as many times as required to actuate the desired character. To enter the word "cap" using the 12-key keypad of FIG. 2 employing the selector method, the user would press the "abc" key once and the selector key twice to enter the letter "c", then press the "abc" key once to enter the letter "a", then press the "pqrs" key once to enter the letter "p".

In both the selector and multitap methods, a desired letter is selected and tentatively actuated, that is displayed on the screen, by pressing a key associated with the desired letter and pressing for the requisite times the selector key or the said key associated with the desired letter, respectively. The selection of the desired letter is finalized when a key other than the selector key or said key associated with the desired letter is pressed. In the multitap method, the selection of a desired letter may also be finalized by a timeout or by pressing the delimiter key.

The multitap method and the selector method are further explained and compared hereforth. The virtual keypad layout shown in FIG. 3 is substantially the same as the 12-key keypad of FIG. 2, but includes a delimiter key ([LIM]) and a selector key ([SEL]). Table 1 shows the key entry sequences necessary to actuate various words using the virtual keypad of FIG. 3, contrasting the two input methods. In Table 1, the keys of the virtual keypad of FIG. 3 are denoted by their respective first alphabet letter, and the number of keystrokes are shown in parenthesis.

TABLE 1

| | Desired output | Entry sequence (Delimiter) | Entry sequence (Selector) |
|---|---|---|---|
| 1 | feeds | ddd [LIM] dd [LIM] dd [LIM] dpppp(15) | d [SEL][SEL] d [SEL] d [SEL] dp [SEL][SEL][SEL] (12) |
| 2 | cast | aaa [LIM] appppt(10) | a [SEL][SEL] ap [SEL][SEL][SEL] t (8) |
| 3 | mono | m [LIM] mmm [LIM] mm [LIM] mmm (11) | mm [SEL][SEL] m [SEL] m [SEL][SEL] (8) |
| 4 | bade | aa [LIM] ad [LIM] dd (8) | a [SEL] add [SEL] (6) |
| 5 | cabin | aaa [LIM] a [LIM] aagggmm (13) | a [SEL][SEL] aa [SEL] g [SEL][SEL] m [SEL] (11) |

Basic shortcomings of all known prior art approaches to designing an overloaded keypad layout are that they have ergonomically inefficient design, slow or cumbersome operating mechanisms, or that they are difficult to learn for the average user. Objects of the present invention are, therefore, to provide an overloaded keypad layout which is simple, efficient, ergonomic, unambiguous, intuitive to operate, and also familiar to the average user in its letter arrangement, and a method of designing the same.

DISCLOSURE OF INVENTION

Provided is an overloaded keypad layout for text input having a QWERTY-like arrangement.

In one embodiment, the keypad layout includes a matrix of a plurality of keys, the matrix including a bottom row, a second row, a third row, and an upper row and N columns, wherein N is 5, 6, 7, or 8, wherein said plurality of keys includes function keys, letter keys, and a space-key for actuating a space in text, wherein the function keys include: a backspace key for deleting text; a language switch key for switching between a first language and a second language; a numeric switch key for switching between a letter input level and a numeric and/or punctuation input level; an enter key; and a shift key for enabling of input of capital letters, wherein the space-key is positioned in a center key of the third row, and the number of center keys is two when N is an even number and the number of center keys is three when N is an odd number, and wherein each of the letter keys enable actuation of at least one of the twenty-six English alphabet letters.

In another embodiment of the keypad layout, the language switch key is positioned in a left-most key of the upper row; the numeric switch key is positioned in a left-most key of the bottom row; the backspace key is positioned in a right-most key of the upper row; and the enter key is positioned in a right-most key of the bottom row.

In another embodiment of the keypad layout, at least letter "a" is positioned in a letter key located in the third row and to the left of the space-key.

In another embodiment of the keypad layout, at least letter "s" is positioned in a letter key located in the third row and to the left of space-key.

In another embodiment of the keypad layout, at least letter "o" and letter "p" are positioned in a letter key together or in two letters keys separately in the third row and to the right of the space-key.

In another embodiment of the keypad layout, letter keys positioned in the second row include letters "d", "f", "g", "h", "j", "k", and "l".

In another embodiment of the keypad layout, letter keys positioned in the bottom row include letters "z", "x", "c", "v", "b", "n", and "m".

In another embodiment of the keypad layout, letter keys positioned in the second row and letter keys positioned to the left of the space-key in the third row include letters "a", "s", "d", "f", "g", "h", "j", "k", and "l".

In another embodiment of the keypad layout, letter keys positioned in the upper row and letter keys positioned to the right of the space-key in the third row include letters "q", "w", "e", "r", "t", "y", "i", "u", "o", and "p".

In another embodiment of the keypad layout, the space-key has a drag-assisted function, wherein the drag assisted function is movement of cursor by pressing the space-key and dragging in the direction of desired cursor movement.

In another embodiment of the keypad layout, the space-key has at least twice the size of a letter key.

In another embodiment of the keypad layout, the function keys further include a selector key positioned in a non-periphery key.

In another embodiment of the keypad layout, the letter keys immediately adjacent to the selector key include at least letters "f", "g", "h", "j", "c", "v", "n", "b", and "m".

In yet another embodiment of the keypad layout, punctuation "." is actuated by operation of the space-key in conjunction with the selector key or by operation of a letter key having only one letter assigned thereto in conjunction with the selector key.

BRIEF DESCRIPTION OF DRAWINGS

FIG. 1 shows a conventional QWERTY keypad layout.

FIG. 2 shows a conventional 12-key keypad layout.

FIG. 3 shows a conventional 12-key keypad layout including delimiter and selector keys.

FIG. 4(a) shows an embodiment of a keypad layout frame.

FIG. 4(b) shows another embodiment of a keypad layout frame.

FIG. 5(a) shows a 4×6 embodiment of a keypad layout employing multitap method.

FIG. 5(b) shows the keystroke distribution of embodiment of FIG. 5(a).

FIG. 6(a) shows another 4×6 embodiment of a keypad layout employing multitap method.

FIG. 6(b) shows the keystroke distribution of embodiment of FIG. 6(a).

FIG. 7(a) shows a 4×7 embodiment of a keypad layout employing multitap method.

FIG. 7(b) shows the keystroke distribution of embodiment of FIG. 7(a).

FIG. 8(a) shows a 4×8 embodiment of a keypad layout employing multitap method.

FIG. 8(b) shows the keystroke distribution of embodiment of FIG. 8(a).

FIG. 9(a) shows a 4×5 embodiment of a keypad layout employing multitap method.

FIG. 9(b) shows the keystroke distribution of embodiment of FIG. 9(a).

FIG. 10(a) shows a 4×6 embodiment of a keypad layout employing selector method.

FIG. 10(b) shows the keystroke distribution of embodiment of FIG. 10(a).

FIG. 11(a) shows another 4×6 embodiment of a keypad layout employing selector method.

FIG. 11(b) shows the keystroke distribution of embodiment of FIG. 11(a).

FIG. 12(a) shows another 4×6 embodiment of a keypad layout employing selector method.

FIG. 12(b) shows the keystroke distribution of embodiment of FIG. 12(a).

FIG. 13(a) shows a 4×7 embodiment of a keypad layout employing selector method.

FIG. 13(b) shows the keystroke distribution of embodiment of FIG. 13(a).

FIG. 14(a) shows a 4×8 embodiment of a keypad layout employing selector method.

FIG. 14(b) shows the keystroke distribution of embodiment of FIG. 14(a).

FIG. 15(a) shows a 4×5 embodiment of a keypad layout employing selector method.

FIG. 15(b) shows the keystroke distribution of embodiment of FIG. 15(a).

FIG. 16(a) shows another 4×6 embodiment of a keypad layout employing selector method where space-key comprises two unit cells.

FIG. 16(b) shows the keystroke distribution of embodiment of FIG. 16(a).

FIG. 17(a) shows another 4×7 embodiment of a keypad layout employing selector method where space-key comprises two unit cells.

FIG. 17(b) shows the keystroke distribution of embodiment of FIG. 17(a).

FIG. 18(a) shows a 4×7 embodiment of a keypad layout employing multitap method where space-key comprises two unit cells.

FIG. 18(b) shows the keystroke distribution of embodiment of FIG. 18(a).

MODE(S) FOR CARRYING OUT THE INVENTION

A. Factors Considered

Figure 20:
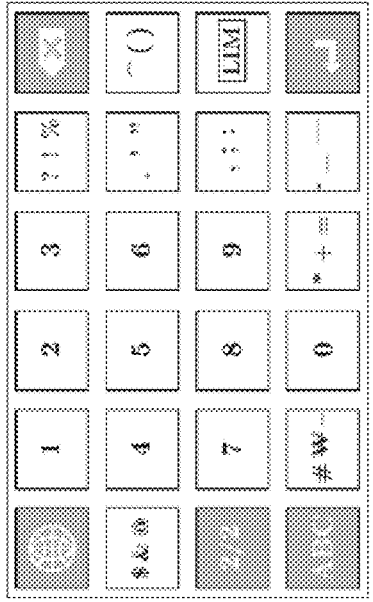
FIG. 20 shows a 4×6 embodiment of the numeric/punctuation/symbol level keypad layout employing multitap method.

Discussed now are the factors that should be taken into consideration in designing an efficient keypad layout. The factors include, but are not limited to, user familiarity, ergonomic design, and keystroke efficiency.

1. User Familiarity—QWERTY-like Keypad

The QWERTY keypad layout of FIG. 1 is the de facto standard keypad layout currently. One of the biggest reasons why the QWERTY keypad layout is successful is because vast majority of computer users are accustomed to the layout due to their familiarity with the computer QWERTY keyboard layout. Although prior keypad layouts have attempted to diverge from the QWERTY layout to a more efficient and ergonomic design, they were not widely received. The QWERTY layout has developed an unsurmountable inertia, and most people are more comfortable using the QWERTY layout of FIG. 1 or a variation thereof than even non-overloaded layouts arranged in alphabetical order.

Furthermore, use of keypad layouts, much like the use of keyboard layouts, is a motor skill learned through repetitive use. However, the more random and stranger the letter arrangements, the harder it would be for a user, and the public as a whole, to overcome the inertia of the QWERTY keypad layout.

Generally, user familiarity is a prominent factor for beginner users of a layout rather than for experienced users. A new user who is unfamiliar with a keypad's letter arrangement and input method must spend time and effort to locate and actuate the desired letters. The unfamiliarity would cause stress and discomfort to a beginner user. However, once a user is familiar and proficient with a keypad's letter arrangement and input method, the user familiarity factor is secondary to the factors of ergonomic keypad design and keystroke efficiency.

Accordingly, the present invention provides a QWERTY-like keypad layout which has identifiable similarities with the QWERTY layout in terms of the letter arrangement order. More particularly, the present invention provides for a QWERTY-like overloaded keypad, in which the number of keys available for text input is less than the number of the alphabet letters.

2. Ergonomic Design—Minimizing the Average Inter-Keystroke Distance

Fitts' Law is a quantitative model for rapid aimed movements. It states that the time required to rapidly move to a target area is a function of the ratio between the distance to the target and the width (or height, whichever is smaller) of the target. Thus in terms of a keypad layout, greater the size of the keys and less the average travel distance (inter-keystroke distance) of an input vehicle (finger(s), stylus, eye gaze, etc.), the less the input time, i.e., greater the input efficiency. In keypad layouts, Fitts' Law applies as a general rule of thumb such that frequently utilized keys should be placed close to the center of the keypad and the less utilized keys should be placed in periphery keys, which are keys located in the outer edges of the keypad layout and at least one side of the key is not adjacent to another key. Thus, alphabets, symbols, and function keys which have high relative frequency should be prioritized to be placed close to the center of the keypad.

Accordingly, keys which are accessed with very high frequency, such as the space-key (␣) in the English language, should be placed close to the center of the keypad.

Further, Fitts' Law applies such that the aspect ratio of a rectangular keypad should be ideally close to 1. However, due to display screen space limitations of the device in which the keypad layout is employed, it may be inefficient use of available display screen space and may be impractical to have a keypad layout with an aspect ratio of 1. The present invention provides for keypad layouts in which the aspect ratio is greater than 1, but not greater than 2.

Furthermore, Fitts' Law applies such that greater the key size, lesser the error rate and greater the input efficiency. In order to maximize the key size, the frame of a keypad layout must be intelligently designed. Function keys which are indispensable should be placed in the keypad layout so that they are user friendly, efficient, intuitive, while also maintaining uniformity in different languages and input levels (alphabet level, numerical/punctuation/symbol levels, etc.).

In order to construct a keypad layout frame which maximizes the area available for text input (thereby indirectly increasing the size of the keys), the following factors should be considered: The number of indispensable function keys, optimum size and location of said function keys, and optimum size and location of the space-key.

Referring now to FIG. 4(a), there is shown a keypad layout frame for the present invention's keypad layouts. The frame comprises unit cells of four rows and N number of columns, where N is 5, 6, 7, or 8. Although each unit cell will be referred as a key, a key may comprise of more than one-unit cell. Furthermore, although the keypad layout frame and the embodiments of the present invention are herein presented in the drawing figures as rectangular in shape and having evenly aligned square keys of even height and width, embodiments of the present invention can comprise non-rectangular keypad layout shape and/or key shape, uneven alignment of rows and/or columns or curved rows and columns, and/or keys of varying sizes, as obvious to the person having ordinary skill in the art.

For nomenclature convenience, specific rows and columns will be denoted in reference to the lowermost row and the leftmost column of a given keypad layout. For example, referring still to FIG. 4(a), the shift key (150) is located in second row, first column, and the backspace key (120) is located in fourth row, $N^{th}$ column.

Referring still to FIG. 4(a), the grey-shaded keys comprise of function keys. The upper left corner of the keypad layout frame comprises a language switch key (110). The upper right corner of the layout comprises a backspace key (120). The lower right corner of the layout comprises an enter key (130). The lower left corner of the layout comprises a numeric/punctuation/symbol level switch key (140), hereafter may be referred to as "the numeric switch key". The first column also comprises a shift key (150) in the second row. The function keys shown in FIG. 4(a), except for the shift key (150) which is indispensable only for languages having upper case and lower case alphabet letters, are indispensable in practically all languages and their functions are obvious to a person having ordinary skill in the art. The indispensable function keys are positioned in the four corners of the keypad layout.

However, alternative keypad layout frames are possible in which the function keys are rearranged amongst the periphery keys of the keypad layout frame. FIG. 4(b) shows an alternative frame design in which the language switch key (111) is located in the third row, first column. Another variation may be that the backspace key is located the second row, $N^{th}$ column. Other variations may be possible and obvious to a person having ordinary skill in the art.

The keypad layout of the present invention comprises a keypad layout frame which is simple, user-friendly, efficient, intuitive, uniform across different languages and input levels, and which also maximizes the keypad area available for text input.

3. Keystroke Efficiency—Minimizing KPC & Disambiguation Method for an Overloaded Keypad The primary indicator of input efficiency in an overloaded keypad layout is the Keystrokes Per Character (KPC) value, κ, κ of a keypad is the number of keystrokes, on average, to generate each character of text in a given language using a given input method. A keypad layout which has only one alphabet letter assigned to each key, such as the QWERTY layout, will have κ of 1 or 100% (without consideration to other symbols and differentiating capital letters). Generally, as the number of keys decrease, κ will increase.

Provided below is Equation (1) for calculation of κ:

$$KPC = \kappa = \kappa' + \delta \quad (1)$$

Where, κ' is KPC value associated with keys for the alphabet letters and or space, and δ is that associated with the delimiter key. They can be calculated by Equations (2) and (3) shown below, respectively.

$$KPC' = \kappa' = \sum_{c \in \{A, \ldots Z, space\}} K_c f_c, \quad (2)$$

$$DPC = \delta = \sum_{k=1}^{N_{K_A}} \sum_{i,j \in k^{th}_{key}} d_{ij}, \quad (3)$$

where, $K_c$ is the number of the keystrokes required to select character c, $f_c$ is the relative frequency of character c, $d_{ij}$ the relative frequency of digram ij, and $N_{K_A}$ is the number of the keys for alphabet letters or space The relative character frequencies ($f_c$) of the alphabet letters and space (␣) in the English language are shown in the column two of Table 2. Unless explicitly stated otherwise, any reference made herein to frequency will be understood as relative frequency. The frequencies shown in Table 2 below is obtained by processing digram frequency data extracted by Dr. I. Scott MacKenzie from the Brown Corpus. The embodiments of the present invention are presented with consideration to relative frequency and relative diagram frequency data obtained from the Brown Corpus. However, the keypad layout design methods and principles can be easily applied to data obtained from another corpus of the English language or pertinent corpus of another language.

TABLE 2

English relative character frequency and calculation of KPC for the 12-key keypad layout.

| Letter | Freq. ($f_c$) | Key Seq. | $K_c$ | $\kappa_c' = f_c K_c$ |
|---|---|---|---|---|
| ␣ | 17.60% | ␣ | 1 | 17.60% |
| e | 10.35% | dd | 2 | 20.69% |
| t | 7.63% | t | 1 | 7.63% |
| a | 6.64% | a | 1 | 6.64% |

TABLE 2-continued

English relative character frequency and calculation of KPC for the 12-key keypad layout.

| Letter | Freq. ($f_c$) | Key Seq. | $K_c$ | $\kappa_c' = f_c K_c$ |
|---|---|---|---|---|
| o | 6.27% | mmm | 3 | 18.81% |
| i | 6.02% | ggg | 3 | 18.06% |
| n | 5.84% | mm | 2 | 11.67% |
| s | 5.32% | pppp | 4 | 21.26% |
| r | 5.06% | ppp | 3 | 15.18% |
| h | 4.49% | gg | 2 | 8.98% |
| l | 3.40% | jjj | 3 | 10.19% |
| d | 3.25% | d | 1 | 3.25% |
| c | 2.55% | aaa | 3 | 7.66% |
| u | 2.24% | tt | 2 | 4.48% |
| m | 2.09% | m | 1 | 2.09% |
| f | 1.92% | ddd | 3 | 5.77% |
| p | 1.67% | p | 1 | 1.67% |
| g | 1.62% | g | 1 | 1.62% |
| w | 1.55% | w | 1 | 1.55% |
| y | 1.41% | www | 3 | 4.24% |
| b | 1.27% | aa | 2 | 2.53% |
| v | 0.82% | ttt | 3 | 2.46% |
| k | 0.54% | jj | 2 | 1.08% |
| x | 0.16% | ww | 2 | 0.33% |
| j | 0.13% | j | 1 | 0.13% |
| q | 0.09% | pp | 2 | 0.18% |
| z | 0.08% | wwww | 4 | 0.31% |
| SUM | 100.00% | | KPC' ($\kappa'$) | 196.06% |

Referring back to Equations (1)-(3), the summation of each character's frequency ($f_c$) multiplied by the number of keystrokes necessary to actuate each character ($K_c$) yields $\kappa'$. For example, in the QWERTY keypad layout, $\kappa'$ is 100% since the number of keystrokes necessary to enter every key is 1, and $\kappa'$ is the summation of all frequencies of all letters and space, which is 100%.

The biggest problem of the 12-key keypad of FIG. 2 is that $\kappa'$ is too large at 196.06% when employing the multitap method with timeout disambiguation. The reason for such high $\kappa'$ is that 1) the keypad assigns is heavily overloaded because twenty-six letters are assigned in eight keys, and 2) the alphabets are assigned in alphabetical order and thus the letters "e", "h", "i", etc., which have high relative frequency in the English language require two, three, or even four keystrokes for their entry.

Calculation of KPC is incomplete with $\kappa'$ alone for multitap methods since $\kappa'$ only accounts for the keystrokes to press letter keys and not for the keystrokes needed for disambiguation. Since multitap methods employ timeout or delimiter key ( LIM ) disambiguation, additional keystrokes to press the delimiter key are necessary to resolve ambiguity. This frequency of disambiguation is quantified by Delimiter Per Character (DPC) value ($\delta$), and $\delta$ can be calculated by Equation (4) shown above. $\delta$ takes into consideration the frequencies of digrams, or two-letter sequences, in the English language. $\delta$ is the total sum of all same-key digram frequencies ($d_{ij}$) of each key in a given keypad layout. The same-key digram frequency of a key, to which more than one letter is assigned, is hereby defined as the sum of frequencies of all digram combinations possible in a given key. For example, if 'a' and 'b' are assigned to a key, the relevant digram combinations are 'aa', 'ab', 'ba', and 'bb', and the same-key digram frequency of this key, $d_{\{ab\}}$, is $d_{aa}+d_{ab}+d_{ba}+d_{bb}$.

Referring now to Table 3 shown below, presented below is the DPC value $\delta$ for the 12-key keypad of FIG. 2. As mentioned above, digram frequencies ($d_{ij}$) were derived from Brown Corpus. The 'mno' key shows highest same-key digram frequency sum at 2.27%, closely followed by the 'def' key. The total sum of same-key digram frequencies ($\delta$) is 8.37%.

TABLE 3

Same-key relative digram frequency of the 12-key keypad of FIG. 3.

| Key | Same Key Digram Frequency | Sum (d) |
|---|---|---|
| 'abc' | $d_{\{abc\}} = d_{aa} + d_{ab} + d_{ac} + d_{ba} + d_{bb} + d_{bc} + d_{ca} + d_{cb} + d_{cc}$ | 0.92% |
| 'def' | $d_{\{def\}} = d_{dd} + d_{de} + d_{df} + d_{ed} + d_{ee} + d_{ef} + d_{fd} + d_{fe} + d_{ff}$ | 1.96% |
| 'ghi' | $d_{\{ghi\}} = d_{gg} + d_{gh} + d_{gi} + d_{hg} + d_{hh} + d_{hi} + d_{ig} + d_{ih} + d_{ii}$ | 1.04% |
| 'jkl' | $d_{\{jkl\}} = d_{jj} + d_{jk} + d_{jl} + d_{kj} + d_{kk} + d_{kl} + d_{lj} + d_{lk} + d_{ll}$ | 0.44% |
| 'mno' | $d_{\{mno\}} = d_{mm} + d_{mn} + d_{mo} + d_{nm} + d_{nn} + d_{no} + d_{om} + d_{on} + d_{oo}$ | 2.27% |
| 'pqrs' | $d_{\{pqrs\}} = d_{pp} + d_{pq} + d_{pr} + d_{ps} + d_{qp} + d_{qq} + d_{qr} + d_{qs} + d_{rp} + d_{rq} + d_{rr} + d_{rs} + d_{sp} + d_{sq} + d_{sr} + d_{ss}$ | 1.15% |
| 'tuv' | $d_{\{tuv\}} = d_{tt} + d_{tu} + d_{tv} + d_{ut} + d_{uu} + d_{uv} + d_{vt} + d_{vu} + d_{vv}$ | 0.57% |
| 'wxyz' | $d_{\{wxyz\}} = d_{ww} + d_{wx} + d_{wy} + d_{wz} + d_{xw} + d_{xx} + d_{xy} + d_{xz} + d_{yw} + d_{yx} + d_{yy} + d_{yz} + d_{zw} + d_{zx} + d_{zy} + d_{zz}$ | 0.02% |
| $\delta$ (DPC: Delimiter Per Character) | | 8.37% |
| $\kappa'$ (KPC' - from Table 2) | | 196.06% |
| $\kappa$ (KPC: Keystroke Per Character) | | 204.43% |

Thus, the KPC value ($\kappa$) for the 12-key keypad of FIG. 2 is 196.06% ($\kappa'$)+8.37% ($\delta$), or 204.43%. Therefore, the 12-key keypad of FIG. 2 requires about twice as much keystrokes than the QWERTY keypad layout of FIG. 1 to enter the same alphabet letter sequence.

Unless otherwise specifically stated, any letter or digram frequencies data disclosed in the present invention is obtained from Brown Corpus. However, the keypad layout design methods and principles disclosed in the present invention can be readily applied to data obtained from another corpus of the English language or a corpus of another language. Presented below in Table 4 is a comparison of letter frequencies data obtained from various corpora of the English language. "BC" is Brown Corpus; "BNC" is British National Corpus; "INC" is IBM News Corpus; and "ICC" is IBM Chat-room Corpus.

TABLE 4

Letter frequency comparison amongst various English language corpora

| char | frq (BC) | frq (BNC) | frq (INC) | frq (ICC) | BC-BNC | BC-INC | BC-ICC |
|---|---|---|---|---|---|---|---|
| ␣ | 17.60% | 18.43% | 16.99% | 17.64% | −0.82% | 0.61% | −0.04% |
| a | 6.64% | 6.61% | 7.01% | 7.03% | 0.04% | −0.37% | −0.39% |
| b | 1.27% | 1.29% | 1.39% | 1.36% | −0.03% | −0.13% | −0.10% |
| c | 2.55% | 2.44% | 2.72% | 2.14% | 0.12% | −0.17% | 0.41% |
| d | 3.25% | 2.93% | 3.29% | 2.87% | 0.32% | −0.03% | 0.38% |

TABLE 4-continued

Letter frequency comparison amongst various English language corpora

| char | frq (BC) | frq (BNC) | frq (INC) | frq (ICC) | BC-BNC | BC-INC | BC-ICC |
|---|---|---|---|---|---|---|---|
| e | 10.35% | 10.28% | 10.08% | 9.33% | 0.07% | 0.27% | 1.02% |
| f | 1.92% | 2.03% | 1.85% | 1.49% | −0.11% | 0.08% | 0.43% |
| g | 1.62% | 1.39% | 1.69% | 1.86% | 0.22% | −0.07% | −0.25% |
| h | 4.49% | 4.90% | 3.85% | 4.67% | −0.41% | 0.64% | −0.18% |
| i | 6.02% | 5.92% | 6.11% | 6.10% | 0.10% | −0.09% | −0.08% |
| j | 0.13% | 0.13% | 0.17% | 0.27% | 0.00% | −0.04% | −0.14% |
| k | 0.54% | 0.47% | 0.69% | 1.02% | 0.07% | −0.16% | −0.48% |
| l | 3.40% | 3.18% | 3.32% | 3.65% | 0.22% | 0.07% | −0.25% |
| m | 2.09% | 2.00% | 2.15% | 2.21% | 0.08% | −0.06% | −0.12% |
| n | 5.84% | 5.80% | 6.09% | 5.49% | 0.03% | −0.26% | 0.34% |
| o | 6.27% | 6.29% | 6.20% | 6.82% | −0.02% | 0.08% | −0.55% |
| p | 1.67% | 1.55% | 1.86% | 1.39% | 0.12% | −0.19% | 0.28% |
| q | 0.09% | 0.08% | 0.08% | 0.06% | 0.01% | 0.01% | 0.02% |
| r | 5.06% | 4.85% | 5.25% | 4.34% | 0.21% | −0.19% | 0.72% |
| s | 5.32% | 5.17% | 5.81% | 5.28% | 0.15% | −0.50% | 0.04% |
| t | 7.63% | 7.78% | 7.37% | 7.25% | −0.15% | 0.26% | 0.38% |
| u | 2.24% | 2.18% | 2.18% | 2.67% | 0.06% | 0.06% | −0.44% |
| v | 0.82% | 0.77% | 0.81% | 0.83% | 0.05% | 0.01% | −0.01% |
| w | 1.55% | 1.76% | 1.46% | 1.81% | −0.21% | 0.09% | −0.26% |
| x | 0.16% | 0.15% | 0.14% | 0.16% | 0.01% | 0.03% | 0.01% |
| y | 1.41% | 1.60% | 1.33% | 2.14% | −0.19% | 0.09% | −0.72% |
| z | 0.08% | 0.03% | 0.11% | 0.10% | 0.05% | −0.03% | −0.02% |
| sum | 100.00% | 100.00% | 100.00% | 100.00% | 0.00% | 0.00% | 0.00% |

Accordingly, the object of the present invention is to provide an efficient overloaded keypad layout which minimizes KPC value ($\kappa$), accounting for relative letter frequencies and digram frequencies.

The keypad layout of the present invention is designed with consideration to the above-discussed factors, including but not limited to user familiarity, ergonomic design, and keystroke efficiency. The detailed embodiments of the present invention are discussed further below, with reference being made to the accompanying drawing figures.

B. Embodiments

Reference will now be made in detail to embodiments of the present invention, examples of which are illustrated in the accompanying drawings, wherein like reference numerals refer to the like elements throughout the several views. In this regard, the present embodiments may have different forms and should not be construed as being limited to the descriptions set forth herein. Accordingly, the embodiments are merely described below, by referring to the figures, to explain aspects of the present description. Terms used herein are for descriptive purposes only and are not intended to limit the scope of the invention. The terms "comprises" and/or "comprising" are used to specify the presence of stated elements, steps, operations, and/or components, but do not preclude the presence or addition of one or more other elements, steps, operations, and/or components. The terms "first," "second," and the like may be used to describe various elements, but do not limit the elements. Such terms are only used to distinguish one element from another. These and/or other aspects become apparent and are more readily appreciated by those of ordinary skill in the art from the following description of embodiments of the present invention, taken in conjunction with the accompanying drawings.

1. Keypad Layout Embodiments Employing Multitap Method

Referring now to FIG. 5(a), there is shown a keypad layout embodiment of the present invention employing the multitap method and incorporating the frame of FIG. 4(a), where N=6. Excluding five function keys of a language switch key (112), a backspace key (122), an enter key (132), a numeric switch key (142), and a shift key (152), there are a total of nineteen keys available for placement of the twenty-six alphabet letters, space-key (162), and the delimiter key (172). The alphabet letters and function keys are arranged as follows:

The space-key (162), which has the highest frequency of 17.60% in the English language (the next highest frequency is only 10.35% for letter "e"), is positioned in one or two of the central keys. The central keys are hereby defined as the keys located in the third row and in the two middle columns (in case where N is even) or in the third row and in the three middle columns (in case where N is odd). The space-key is positioned in one of the central keys to maximize input efficiency in accordance with Fitts' Law such that the overall finger travel distance is minimized. The space-key may also be larger in size relative to the letter keys.

Referring still to the keypad layout embodiment of FIG. 5(a), the space-key (162) is positioned in one of the central keys (182). The space-key (162) may also comprise four arrows pointing towards four directions to indicate that the space-key (162) may also operate as a cursor movement key. A cursor may be moved in a desired movement direction by a drag-assisted keystroke originating from the space-key (162) towards the desired movement direction.

Referring still to FIG. 5(a), the delimiter (172) is positioned in the key located in second row, sixth column Since the frequency of the delimiter key is low (0.59%) for the embodiment of FIG. 5(a), it is positioned in one of the periphery keys.

The alphabet letters are arranged such that the keypad layout retains identifiable similarities to the QWERTY keypad of FIG. 1. Letters corresponding to QWERTY layout's home row ("a", "s", "d", "f", "g", "h", "j", "k", and "l") are positioned in the home row block (192) located in the second and third rows. Letters corresponding to QWERTY layout's upper row ("q", "w", "e", "r", "t", "y", "u", "i", "o", and "p") are positioned in the fourth row and the remaining keys in the third row. Letters corresponding to QWERTY layout's lower row ("z", "x", "c", "v", "b", "n", and "m") are positioned in the first row.

Since the number of available keys for text are fewer than the number of letters, more than one letter must be assigned to some of the keys. The letter frequencies are shown in Table 2 above. Letters with high frequencies are assigned such that they are alone to a key or that they are the first letter in a letter group of an overloaded key to ensure that they may be actuated by a single keystroke. For example, letters with high frequency rates such as "e", "r", "a", etc., should be assigned to a key by itself. Further, punctuation symbols may be assigned to one of the keys with or without alphabet letters. In the embodiment shown in FIG. 5(a), the punctuation symbols "." and "," are placed within the key comprising the letters "zx" (201). By prioritizing high frequency letters, the KPC' value (κ') is minimized For keys to which multiple keys are assigned, the same-key digram frequencies (sum of DPC values relative to a given key) are considered and minimized Table 5 below shows possible letter groups in a QWERTY-like keypad layout, and their same-key digram frequencies. Once the letter groups are determined based on minimum DPC value (δ) per key, the order of the letters within the letter group may be rearranged within a key so that the letter having the highest frequency appears as the first letter of the key, thereby reducing the KPC' value (κ'). In case of a three letter group, the letter having the highest frequency rate would appear first, then the letter having the next highest frequency rate would appear second, and the letter having the lowest frequency rate would appear last. Still referring to FIG. 5(a), the order of the letters was changed in "wq" key (242), "iu" key (234), "hkj" key (224), and "nb" key (214). For "zx" key (212), the punctuation symbols "." and "," appear first before the letters "z" and "x" since these punctuations have much higher frequencies (about ten times) in the English language than the letters "z" and "x".

of FIG. 4(b), where N=6. Keypad layout of FIG. 6(a) comprises the language switch key (113) in the third row instead of the fourth row as in FIG. 5(a). The keystroke distribution for the keypad layout of FIG. 6(a) is presented in FIG. 6(b).

Figures 7A, 7B, 8A, 8B:
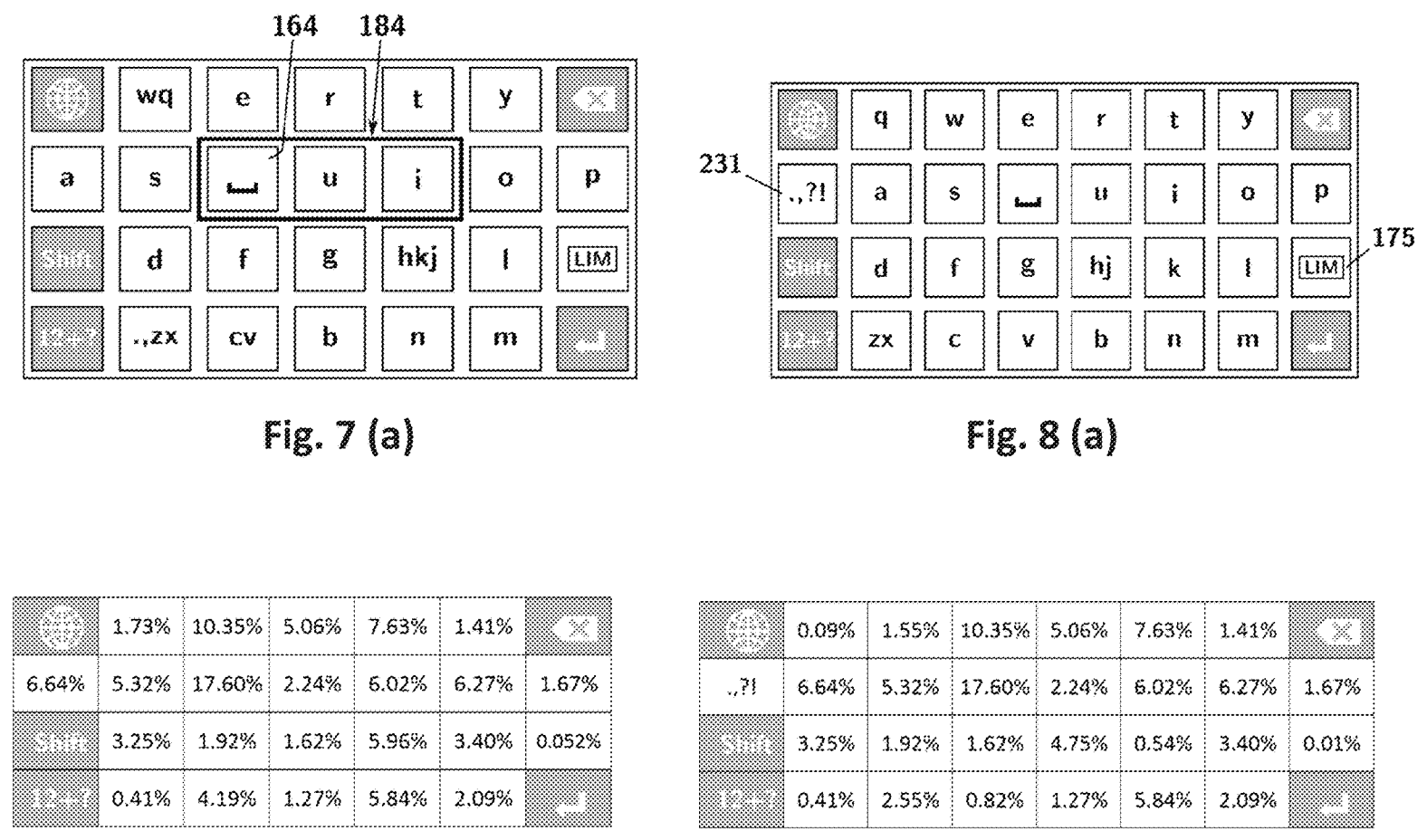

Referring now to FIG. 7(a), there is shown yet another embodiment of the keypad layout of the present invention employing the multitap method incorporating the frame of FIG. 4(a), where N=7. The space-key (164) is positioned in one of the central keys (184). Since the embodiment of FIG. 7(a) consists of seven columns, there are four more available keys for text input for a total of twenty-three keys. Therefore, the keypad is "less overloaded" than the embodiments of FIGS. 5(a) and 6(a), which results in lower KPC value (κ). However, a disadvantage of the keypad layout embodiment of FIG. 7(a) is that the key sizes are smaller and the aspect ratio is greater compared to the embodiments of FIGS. 6(a) and 7(a). The keystroke distribution for the keypad layout of FIG. 7(a) is presented in FIG. 7(b).

Referring now to FIG. 8(a), there is shown yet another embodiment of the keypad layout of the present invention employing the multitap method incorporating the frame of FIG. 4(a), where N=8. The delimiter key (175) is positioned in second row, eighth column. Since the embodiment of FIG. 8(a) consists of eight columns, there are four more available keys for text input for a total of twenty-seven. In this embodiment, KPC value (κ) is very close to 100% (100.30%) since all keys except two consist of only one alphabet letter. This embodiment also includes a key comprised of most-oft used punctuations (231). The keystroke distribution for the keypad layout of FIG. 8(a) is presented in FIG. 8(b).

Referring now to FIG. 9(a), there is shown yet another embodiment of the keypad layout of the present invention

TABLE 5

Possible letter groups in a QWERTY-like keypad layout and their same-key digram frequencies

| qw | we | er | rt | ty | yu | ui | io | op | | qwe |
|---|---|---|---|---|---|---|---|---|---|---|
| 0.00% | 0.61% | 2.84% | 0.68% | 0.28% | 0.01% | 0.08% | 0.69% | 0.63% | | 0.64% |
| as | sd | df | fg | gh | hj | jk | kl | | dfg | hjk |
| 1.02% | 0.37% | 0.13% | 0.11% | 0.20% | 0.00% | 0.00% | 0.44% | | 0.17% | 0.00% |
| zx | xc | cv | vb | bn | nm | | zxcv | cvb | bnm | czx |
| 0.01% | 0.06% | 0.04% | 0.01% | 0.07% | 0.14% | | 0.06% | 0.06% | 0.22% | 0.06% |

Referring now to FIG. 5(b), there is shown the keystroke distribution of each individual keys corresponding to the keypad layout of FIG. 5(a). The keystroke distribution displayed is the sum of all relevant character frequencies ($f_c$) multiplied by corresponding required number of keystrokes. The DPC value (δ) is shown in the delimiter key position (second row, sixth column) as 0.59%. The sum of all individual key KPC' values (κ') and the DPC value (δ) is the total KPC value (κ). Note that key distribution of "zx" key (212) does not consider the frequencies of the punctuations "." and ",". This applies to all 4×6 and 4×7 keypad layout embodiments and their keystroke distribution charts in which letters "z" and "x" and punctuations "." and "," are grouped together in the same key.

Referring now to FIG. 6(a), there is shown another embodiment of the keypad layout of the present invention employing the multitap method and incorporating the frame employing the multitap method incorporating the frame of FIG. 4(a), where N=5. Since the embodiment of FIG. 9(a) consists of five columns, there are a total of fifteen keys available for text input. The keystroke distribution for the keypad layout of FIG. 9(a) is presented in FIG. 9(b).

2. Keypad Layout Embodiments Employing Selector Method

Referring now to FIG. 10(a), there is shown yet another keypad layout embodiment employing the selector method with the frame of FIG. 4(a), where N=6. The letter placement method for a keypad layout employing a selector method is substantially similar to the letter placement method for a keypad layout employing a multitap method. However, there are two key differences. First, the selector key is preferably positioned close to keys to which multiple letters (or punctuations) are assigned to minimize the average time to enter a character in accordance with Fitts' Law.

Correspondingly, keys immediately adjacent or near the selector key are preferably assigned multiple letters (or punctuations). Second, the same-key diagram frequencies are ignored when determining the optimum letter groups.

Referring still to FIG. 10(a), a selector key (372) is positioned in second row, fourth column. The Selector per Character (SPC) value, σ, is 828% for the keypad layout of FIG. 10(a), which is the third highest relative frequency rate after the space-key (17.60%) and letter "e" (10.35%). SPC value (σ) varies depending on the keypad layout's letter arrangement, and σ is calculated by Equation (4) shown below:

$$KPC = \kappa = \kappa' + \sigma = 1 + \sigma, \quad (4)$$

where σ can be calculated by Equation (5) shown below:

$$SPC = \sigma = \sum_{k=1}^{N_{K_A}} \sum_{c \in k^{th} key} S_c f_c, \quad (5)$$

where,
$S_c$ is the number of selector tapping required to select character c,
$f_c$ is the relative frequency of character c, and
$N_{K_A}$ is the number of the keys for alphabet letters of space.

The selector key is a function key for actuating letters which are not first-assigned letters to a key. As such, Fitts' Law dictates that selector key should be positioned near keys which have multiple letters assigned to them, especially those keys which have second-assigned letters with relatively high frequency. Referring still to FIG. 10(a), the selector key (372) is positioned in the second row, fourth column adjacent to "iu", "fg", "hkj", and "nb". As such, overall finger travel distance to enter the selector key (372) is minimized FIG. 10(b) shows the keystroke distribution of the keypad layout of FIG. 10(a). The total KPC value (κ) of keypad layout of FIG. 10(a) employing selector method is 108.28% and total KPC value (κ) of keypad layout of FIG. 5(a) employing multitap method is 109.00%. The difference is mainly caused by the extra keystrokes due to delimiter key use.

The second key difference between the multitap method and the selector method is that in the selector method, the same-key digram frequencies are ignored when determining the letters groups. Referring now to FIG. 11(a), there is shown another embodiment of the keypad layout of the present invention employing the selector method and incorporating the frame of FIG. 4(a), where N=6.

The keypad layout embodiment of FIG. 11(a) shows a variation of the letter groups for letters "u", "i", "o", and "p". In the keypad layout embodiments of 10(a), letters "i" and "u" are grouped together in one key and letters "o" and "p" are assigned alone in separate keys, while in the keypad layout embodiment of FIG. 11(a), letters "u" and "i" are positioned alone in separate keys while letters "o" and "p" are grouped together in one key (436). In the selector method, the difference in the input efficiency for these variations in key groups is minimal.

In the multitap method, however, grouping letters "o" and "p" in a same key is not optimal. While letters "u" and "i" have higher letter frequencies than letter "p," letters "u" and "i" should be grouped together (with letter "i" positioned first since its letter frequency is higher than that of letter "u") in the multitap method because the same-key digram frequency of letters "op" is relatively high at 0.63%. Thus, while grouping "o" and "p" together would slightly decrease KPC' value (κ'), due to letters "u" and "i" being assigned to their own keys, it would increase DPC value (δ) and user discomfort. Conversely, in the selector method, same-key digram frequencies can be ignored, and thus letters "u" and "i" can be assigned in their own keys while letters "o" and "p" can be grouped together in one key By the same principle, a variation of letter groups is possible for letters "h", "j", "k", and "l". In the keypad layout embodiment of FIG. 10(a), letters "h" and "j" are grouped together in one key and letters "l" and "k" are grouped together in another key. Alternatively, as shown in the keypad layout embodiment of FIG. 11(a), letters "h", "k", and "j" can be grouped together in one key (425) while letter "l" is assigned to its own key. The former variation where letters "l" and "k" are grouped together is not optimal for the multitap method because the same-key digram frequency for "lk" is relatively high at 0.44%. However, in the selector method, the former variation is viable.

The keystroke distribution for the keypad layout embodiment of FIG. 11(a) is presented in FIG. 11(b).

Referring now to FIG. 12(a), there is shown another embodiment of the keypad layout of the present invention employing the selector method and incorporating the frame of FIG. 4(b), where N=6. The frame of FIG. 4(b) comprises the language switch key in the third row instead of the fourth row as in FIG. 4(a). The keystroke distribution for the keypad layout of FIG. 12(a) is presented in FIG. 12(b).

Figures 13A, 13B, 14A, 14B:
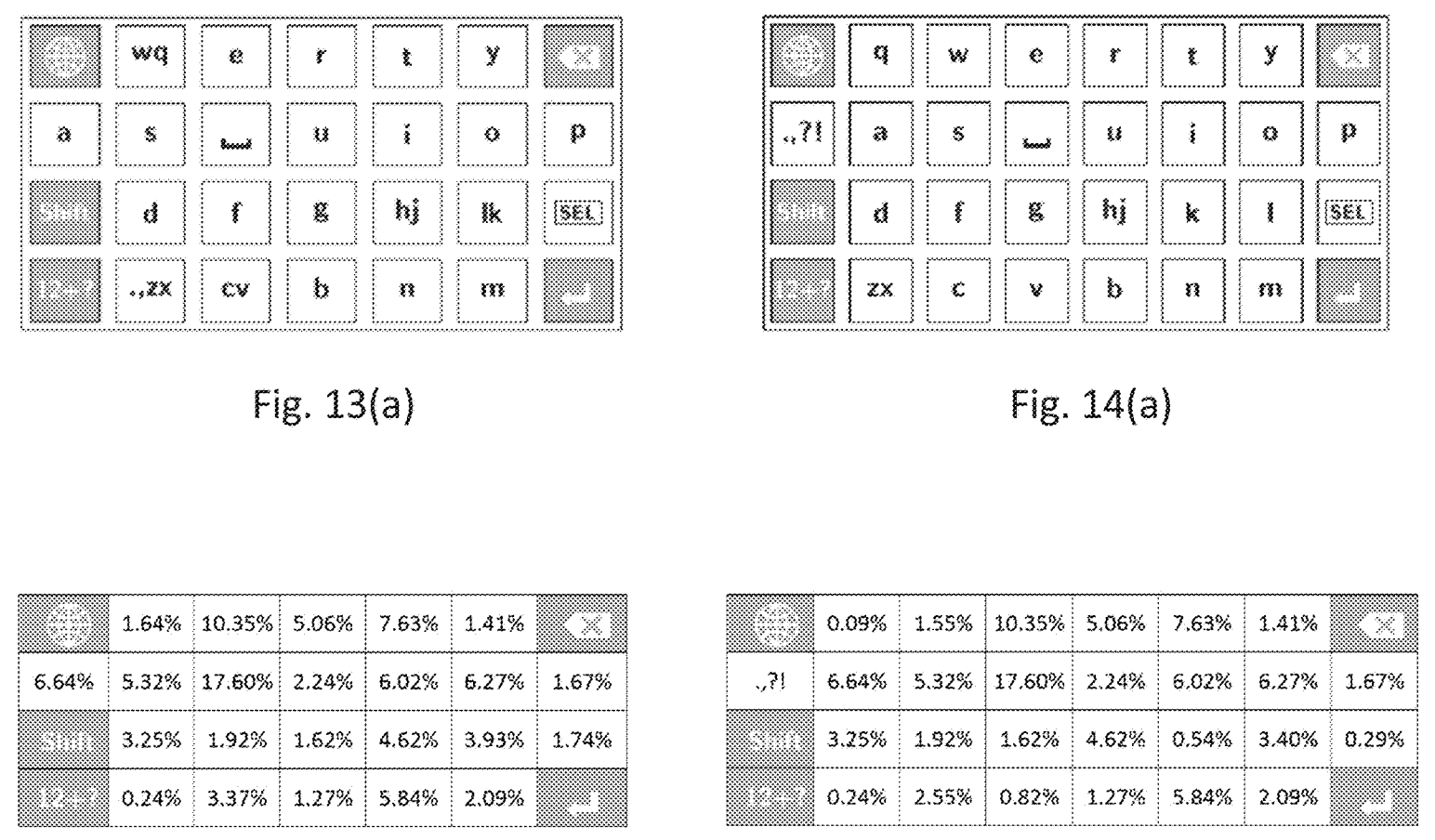

Referring now to FIG. 13(a), there is shown yet another embodiment of the keypad layout of the present invention employing the selector method incorporating the frame of FIG. 4(a), where N=7. Since the embodiment of FIG. 13(a) consists of seven columns, there are a total of twenty-three available keys for text input. The keystroke distribution for the keypad layout of FIG. 13(a) is presented in FIG. 13(b).

Referring now to FIG. 14(a), there is shown yet another embodiment of the keypad layout of the present invention employing the selector method incorporating the frame of FIG. 4(a), where N=8. Since the embodiment of FIG. 14(a) consists of eight columns, there are a total of twenty-seven keys available for text input. In this embodiment, KPC value (κ) is very close to 100% (100.29%) since all keys except two consist of only one alphabet letter. The keystroke distribution for the keypad layout of FIG. 14(a) is presented in FIG. 14(b).

Figures 15A, 15B, 16A, 16B:
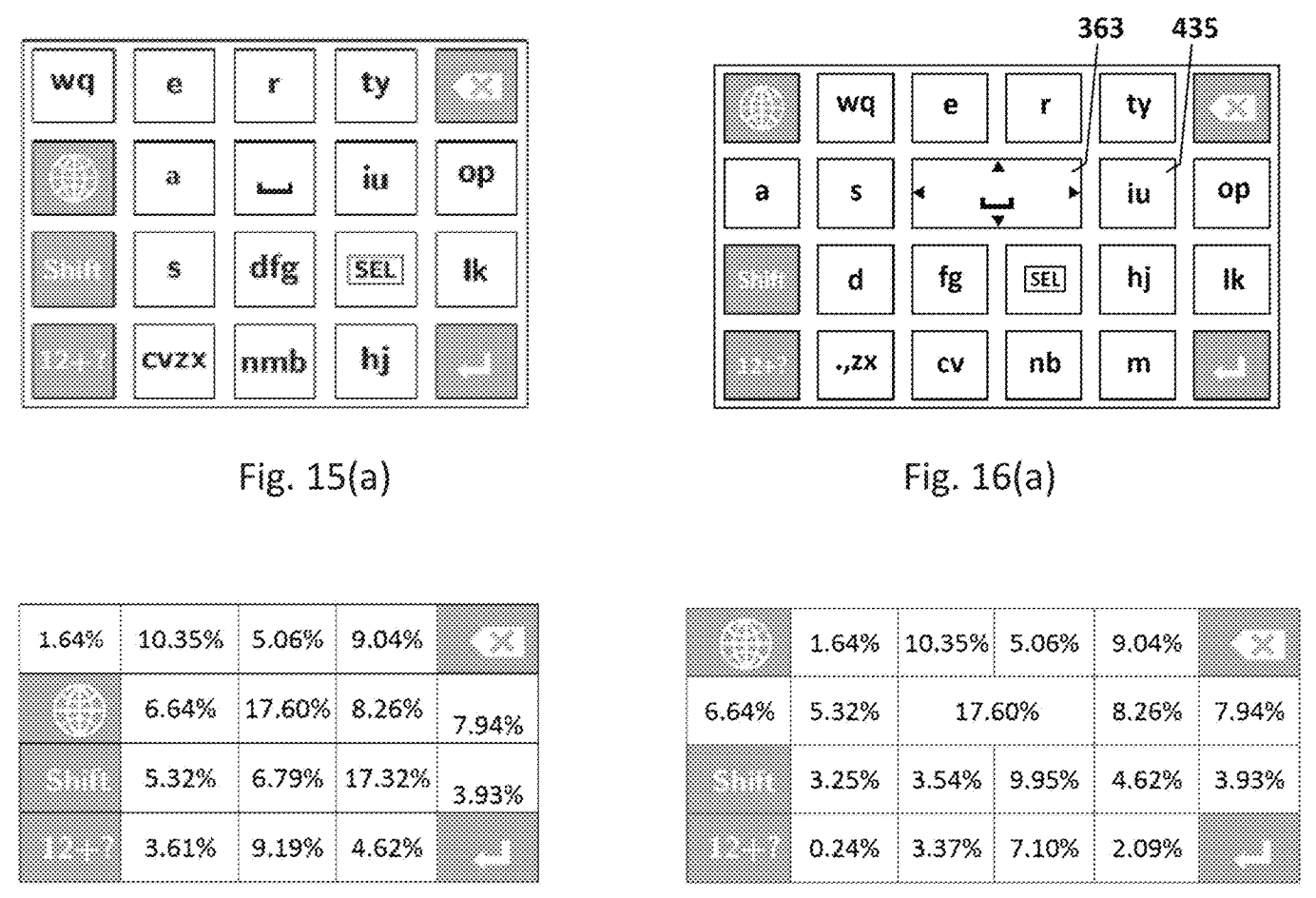

Referring now to FIG. 15(a), there is shown yet another embodiment of the keypad layout of the present invention employing the selector method incorporating the frame of FIG. 4(b), where N=5. Since the embodiment of FIG. 15(a) consists of five columns, there are a total of fifteen keys available for text input. The keystroke distribution for the keypad layout of FIG. 15(a) is presented in FIG. 15(b).

Referring now to FIG. 16(a), there is shown yet another embodiment of the keypad layout of the present invention employing the selector method incorporating the frame of FIG. 4(a), where N=6. The space-key (363), which has the highest frequency rate of 17.60%, occupies two unit cells in the middle of the third row. Letters "i" and "u" are grouped together in one key (435). The keystroke distribution for the keypad layout of FIG. 16(a) is presented in FIG. 16(b).

Figures 17A, 17B, 18A, 18B:
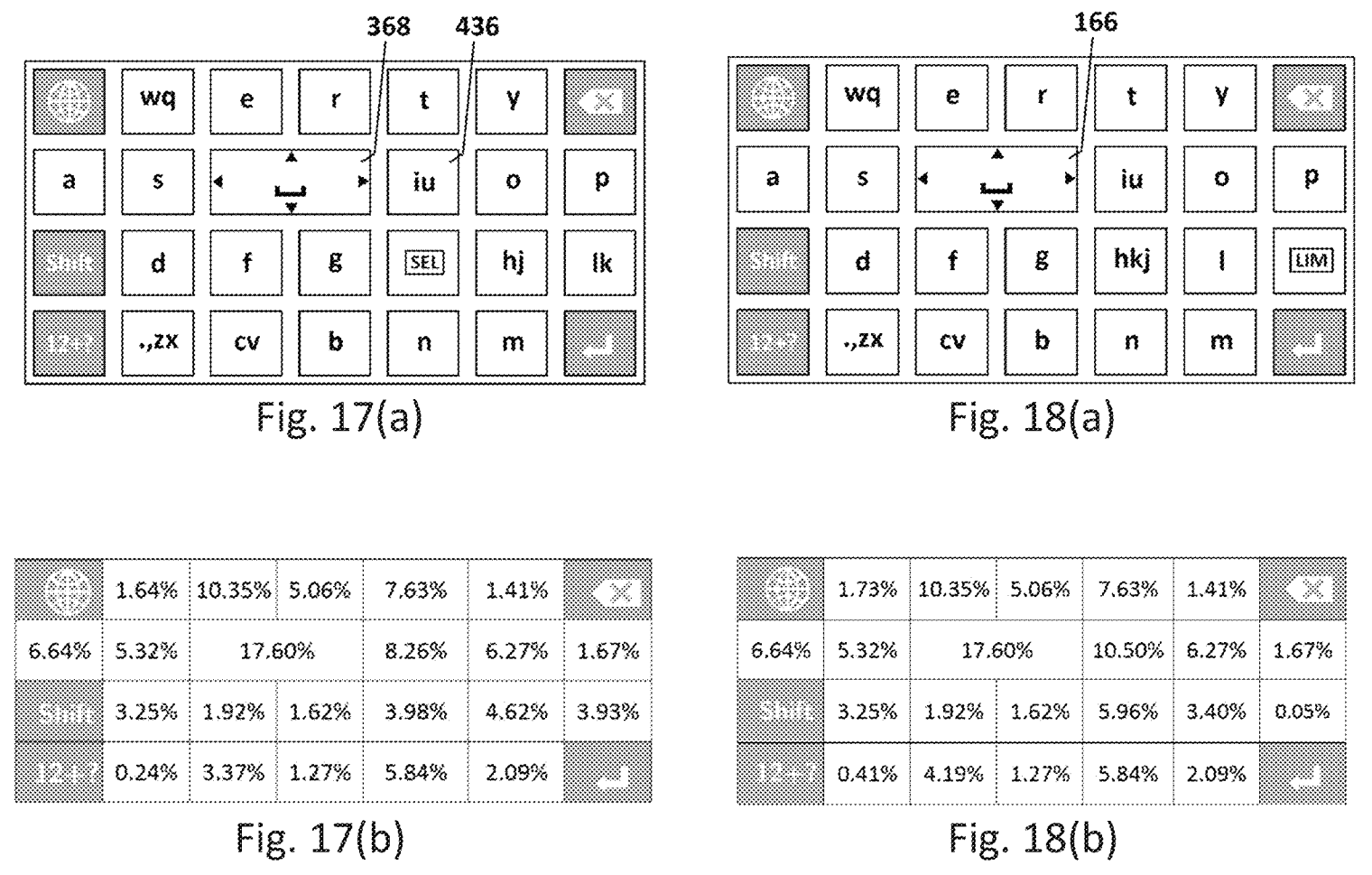

Referring now to FIG. 17(a), there is shown yet another embodiment of the keypad layout of the present invention employing the selector method incorporating the frame of FIG. 4(a), where N=7. The space-key (368), which has the highest frequency rate of 17.60%, occupies two unit cells near the center of the third row. Letters "i" and "u" are grouped together in one key (436). The keystroke distribution for the keypad layout of FIG. 16(a) is presented in FIG. 16(b).

Referring now to FIG. 18(a), there is shown yet another embodiment of the keypad layout of the present invention employing the multitap method incorporating the frame of FIG. 4(a), where N=7. The space-key (166), which has the highest frequency rate of 17.60%, occupies two unit cells near the center of the third row. The keystroke distribution for the keypad layout of FIG. 18(a) is presented in FIG. 18(b).

Figure 21:
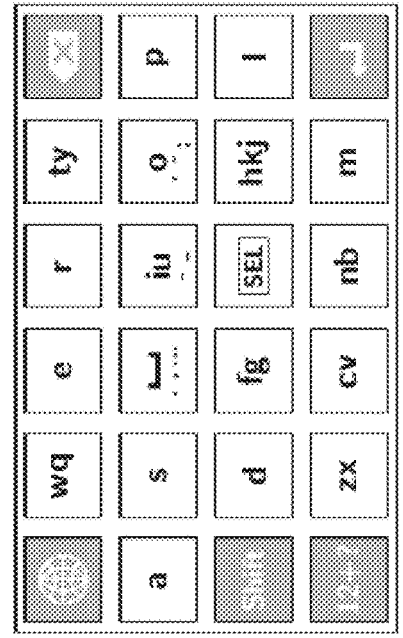
FIG. 21 shows another 4×6 embodiment of a keypad layout employing selector method.

Referring now to FIG. 21, there is shown another embodiment of the keypad layout of the present invention employing the selector method and incorporating the frame of FIG. 4(a), where N=6. In contrast to the keypad layout of FIG. 10(a), letters "h", "k", and "j" are grouped together in second row, fifth column key, and letter "l" is solely assigned to second row, sixth column key in FIG. 21. Further, punctuations ".", ",", and " . . . " are assigned together with the Space key, and they are entered using the selector key.

Figure 22:
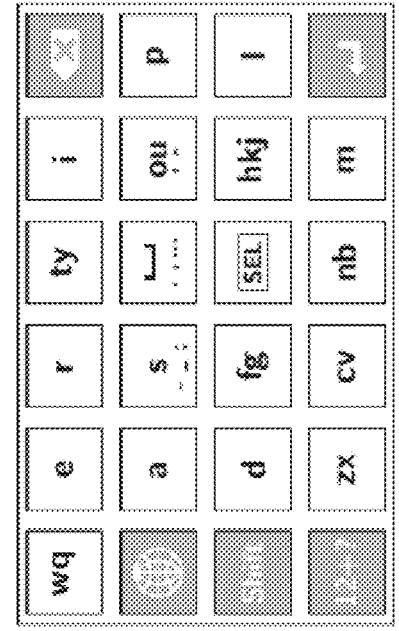
FIG. 22 shows another 4×6 embodiment of a keypad layout employing selector method.

Referring now to FIG. 22, there is shown another embodiment of the keypad layout of the present invention employing the selector method and incorporating the frame of FIG. 4(b), where N=6. In contrast to the keypad layout of FIG. 12(a), letters "h", "k", and "j" are grouped together in second row, fifth column key, and letter "l" is solely assigned to second row, sixth column key in FIG. 22. Further, punctuations ".", ",", and " . . . " are assigned together with the Space key. Furthermore, letters "o" and "u" are grouped together in third row, fifth column key, and letter "i" is solely assigned to fourth row, fifth column key.

As shown in FIGS. 22 and 23, punctuations and symbols may be assigned to keys others than the Space key. Preferably, keys located immediately adjacent to the selector key which have only one or two letters assigned may be utilized to enter punctuations and symbols by using the selector key. For example, referring now to FIG. 22, semicolon ";" may be actuated by pressing "s" key once, then the selector key three times.

Presented below in Table 6 is a comparison chart of the prior arts and the embodiments of the present invention. The embodiments of the present invention are denoted by the row×column number, input method ("D" for multitap method and "S" for selector method), and by the corresponding figure number.

3. Numeric, Punctuation, and Symbol Level Layouts

Figure 19:
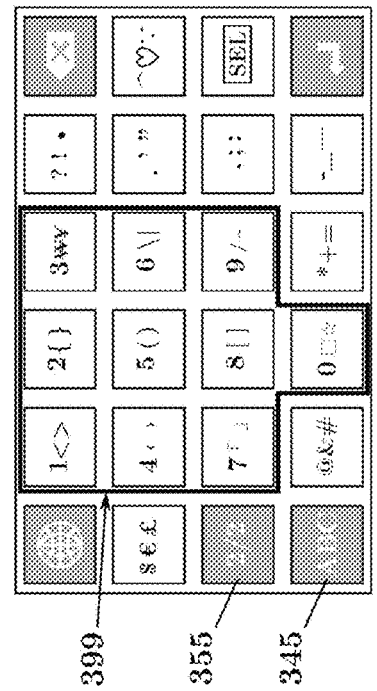
FIG. 19 shows a 4×6 embodiment of the numeric/punctuation/symbol level keypad layout employing selector method.

Referring now to FIG. 19, shown is an embodiment of overloaded keypad layout for input of numbers, punctuations, and symbols. This embodiment layout may be accessed from letter input level keypad layout embodiments of the present invention (FIGS. 5(a), 6(a), 7(a), etc.) by pressing the numeric switch key (140). Referring still to FIG. 19, three numbers, punctuations, and/or symbols are assigned to each non-function key, and they may be actuated by a disambiguating input method, such as the multitap method or the selector method. The selector method is preferred in the embodiment of FIG. 18. Since multiple characters are associated with the ten numerical keys (399), employing the multitap method would make actuating consecutive same-key numbers cumbersome, while in the selector method, same-key digrams can be ignored as discussed above. Further, additional pages of keypad layouts may be available to the user for access to more punctuations, symbols, emoticons, etc., and the additional pages may be accessed by pressing switch page key (355). The user may return to the text input keypad layout by pressing letter input level switch key (345)

Referring now to FIG. 20, there is shown another embodiment of an overloaded keypad layout for input of numbers, punctuations, and symbols. In the embodiment of FIG. 20, multitap method is viable for disambiguation of the overloaded keys.

In both FIGS. 19 and 20, additional levels of keypad layouts may be available to the user for access to more punctuations, symbols, emoticons, etc. Further, each key may be adjusted to have more or less than three number, punctuation, or symbol assignments to the keys, and alternative variations may be available and obvious to a person having ordinary skill in the art.

It is to be understood that the embodiments described herein are that for presently preferred embodiments and thus should be considered in a descriptive sense only and not for purposes of limitation. Descriptions of features or aspects within each embodiment should typically be considered as available for other similar features or aspects in other embodiments.

INDUSTRIAL APPLICABILITY

Present invention may be applied to electronic devices having touchscreen keypads, including, but are not limited to, smart phones, tablet PC on-screen keyboards, GPS

TABLE 6

Comparison chart of keypad parameters for prior arts and embodiments of the present invention

| Layout | FIG. | Ftn key | $N_{kt}$ | KPC' ($\kappa'$) | DPC ($\delta$) | SPC ($\sigma$) | KPC ($\kappa$) |
| --- | --- | --- | --- | --- | --- | --- | --- |
| 12-key-D | FIG. 3 | LIM | 10 | 196.06% | 8.37% | | 204.43% |
| 4x5-D | FIG. 9(a) | LIM | 15 | 117.45% | 1.43% | | 118.89% |
| 4x6-D | FIG. 5(a) | LIM | 19 | 108.41% | 0.59% | | 109.00% |
| 4x7-D | FIG. 7(a) | LIM | 23 | 101.87% | 0.05% | | 101.92% |
| 4x8-D | FIG. 8(a) | LIM | 25 | 100.29% | 0.01% | | 100.30% |
| 12-key-S | FIG. 3 | SEL | 10 | 100% | | 8.37% | 108.37% |
| 4x5-S | FIG. 15(a) | SEL | 15 | 100% | | 17.32% | 117.32% |
| 4x6-S1 | FIG. 10(a) | SEL | 19 | 100% | | 8.28% | 108.28% |
| 4x6-S2 | FIG. 11(a) | SEL | 18 | 100% | | 9.95% | 109.95% |
| 4x7-S1 | FIG. 12(a) | SEL | 23 | 100% | | 1.74% | 101.74% |
| 4x7-S2 | FIG. 13(a) | SEL | 22 | 100% | | 3.98% | 103.98% |
| 4x8-S | FIG. 14(a) | SEL | 26 | 100% | | 0.29% | 100.29% |
| QWERTY | FIG. 1 | none | 27 | 100% | | 0% | 100% | navigational systems, PDAs, kiosks, etc. As such, industrial applicability exists for the present invention.

The invention claimed is:

1. A keypad layout for text input comprising:
a matrix of a plurality of keys, the matrix comprising a bottom row, a second row, a third row, and an upper row and N columns, wherein N is 5, 6, 7, or 8,
wherein said plurality of keys comprises function keys, letter keys, and a space-key for actuating a space in text,
wherein the function keys comprise:
a backspace key for deleting text;
a language switch key for switching between a first language and a second language;
a numeric switch key for switching between a letter input level and a numeric and/or punctuation input level;
an enter key; and
a shift key for enabling of input of capital letters,
wherein the space-key is positioned in a center key of the third row, and the number of center keys is two when N is an even number and the number of center keys is three when N is an odd number,
and wherein each of the letter keys enable actuation of at least one of the twenty-six English alphabet letters.

2. The keypad layout for text input of claim 1, wherein the language switch key is positioned in a left-most key of the upper row; the numeric switch key is positioned in a left-most key of the bottom row; the backspace key is positioned in a right-most key of the upper row; and the enter key is positioned in a right-most key of the bottom row.

3. The keypad layout for text input of claim 1, wherein at least letter "a" is positioned in a letter key located in the third row and to the left of the space-key.

4. The keypad layout for text input of claim 1, wherein at least letter "s" is positioned in a letter key located in the third row and to the left of space-key.

5. The keypad layout for text input of claim 1, wherein at least letter "o" and letter "p" are positioned in a letter key together or in two letters keys separately in the third row and to the right of the space-key.

6. The keypad layout for text input of claim 1, wherein letter keys positioned in the second row comprise of letters "d", "f", "g", "h", "j", "k", and "l".

7. The keypad layout for text input of claim 1, wherein letter keys positioned in the bottom row comprise of letters "z", "x", "c", "v", "b", "n", and "m".

8. The keypad layout for text input of claim 1, wherein letter keys positioned in the second row and letter keys positioned to the left of the space-key in the third row comprise of letters "a", "s", "d", "f", "g", "h", "j", "k", and "l".

9. The keypad layout for text input of claim 1, wherein letter keys positioned in the upper row and letter keys positioned to the right of the space-key in the third row comprise of letters "q", "w", "e", "r", "t", "y" "i", "u", "o", "p".

10. The keypad layout for text input of claim 1, wherein the space-key has a drag-assisted function, wherein the drag assisted function is movement of cursor by pressing the space-key and dragging in the direction of desired cursor movement.

11. The keypad layout for text input of claim 1, wherein the space-key has at least twice the size of a letter key.

12. The keypad layout for text input of claim 1, wherein the function keys further comprise a selector key positioned in a non-periphery key.

13. The keypad layout for text input of claim 12, wherein the letter keys immediately adjacent to the selector key comprise of at least letters "f", "g", "h", "j", "c", "v", "n", "b", and "m".

14. The keypad layout for text input of claim 12, wherein punctuation "." is actuated by operation of the space-key in conjunction with the selector key or by operation of a letter key having only one letter assigned thereto in conjunction with the selector key.

* * * * *